(12) United States Patent
Baric et al.

(10) Patent No.: US 11,958,498 B2
(45) Date of Patent: Apr. 16, 2024

(54) DATA-DRIVEN WARM START SELECTION FOR OPTIMIZATION-BASED TRAJECTORY PLANNING

(71) Applicant: TOYOTA RESEARCH INSTITUTE, INC., Los Altos, CA (US)

(72) Inventors: Miroslav Baric, Los Altos, CA (US); Jin Ge, Los Altos, CA (US); Timothee Cazenave, Los Altos, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 246 days.

(21) Appl. No.: 17/001,602

(22) Filed: Aug. 24, 2020

(65) Prior Publication Data

US 2022/0055651 A1 Feb. 24, 2022

(51) Int. Cl.
| | |
|---|---|
| *B60W 60/00* | (2020.01) |
| *B60W 50/00* | (2006.01) |
| *G05D 1/00* | (2006.01) |
| *G05D 1/02* | (2020.01) |
| *G06F 18/2113* | (2023.01) |
| *G06N 3/08* | (2023.01) |
| *G06N 20/00* | (2019.01) |

(52) U.S. Cl.
CPC ...... *B60W 60/001* (2020.02); *B60W 50/0097* (2013.01); *G05D 1/0212* (2013.01); *G06F 18/2113* (2023.01); *G06N 3/08* (2013.01); *G06N 20/00* (2019.01); *B60W 2050/0026* (2013.01)

(58) Field of Classification Search
None
See application file for complete search history.

(56) References Cited

U.S. PATENT DOCUMENTS

| | | |
|---|---|---|
| 9,754,490 B2 | 9/2017 | Kentley |
| 9,977,430 B2 | 5/2018 | Shalev-Shwartz |

(Continued)

FOREIGN PATENT DOCUMENTS

| | | | |
|---|---|---|---|
| CN | 111752261 A * | 10/2020 | ............. G05B 17/02 |
| WO | 2017197170 A1 | 11/2017 | |
| WO | 2020001867 A1 | 1/2020 | |

OTHER PUBLICATIONS

"Lei Yin, Automatic driving test platform based on autonomous driving robot, 2020" (Year: 2020).*

(Continued)

*Primary Examiner* — James M McPherson
*Assistant Examiner* — Bakari Underwood
(74) *Attorney, Agent, or Firm* — SHEPPARD, MULLIN, RICHTER & HAMPTON LLP; Hector A. Agdeppa; Daniel N. Yannuzzi

(57) ABSTRACT

Systems and methods for trajectory planning for an autonomous vehicle, may include: computing features for each of the plurality of candidate trajectories; computing scores for the features of the candidate trajectories, wherein the scores are based on parameter values associated with their corresponding final trajectories; determining, based on the computed scores, a trajectory of the candidate trajectories to be used as a warm-start trajectory for trajectory optimization and applying the warm-start trajectory to develop a final trajectory for the vehicle; and autonomously operating the autonomous vehicle in accordance with the final trajectory.

24 Claims, 7 Drawing Sheets

(56) References Cited

U.S. PATENT DOCUMENTS

| | | | |
|---|---|---|---|
| 9,989,964 B2 | 6/2018 | Berntorp | |
| 2019/0033085 A1* | 1/2019 | Ogale | G01C 21/3446 |
| 2019/0346851 A1* | 11/2019 | Liu | G05D 1/0217 |
| 2020/0159225 A1* | 5/2020 | Zeng | G05D 1/0212 |
| 2021/0365032 A1* | 11/2021 | Ichnowski | G06N 3/045 |

OTHER PUBLICATIONS

Self driving car path planning with hyperloop option (https://www.intellias.com/path-planning-for-autonomous-vehicles-with-hyperloopoption/), Mar. 1, 2018.

AI-based movement planning for autonomous and teleoperated vehicles including the development of a simulation environment and an intelligent agent (https://mediatum.ub.tum.de/doc/1453739/1453739.pdf).

Advanced planning for autonomous vehicles using reinforcement learning and deep inverse reinforcement learning (https://www.researchgate.net/publication/330400231_Advanced_Planning_for_Autonomous_Vehicles_Using_Reinforcement_Learning_and_Deep_Inverse_Reinforcement_Learning).

* cited by examiner

DATA-DRIVEN WARM START SELECTION FOR OPTIMIZATION-BASED TRAJECTORY PLANNING

TECHNICAL FIELD

The present disclosure relates generally to trajectory planning, and in particular, some implementations may relate to warm start selection for trajectory planning.

DESCRIPTION OF RELATED ART

Autonomous vehicle technology is becoming more commonplace with the introduction of new vehicles each model year. While widespread adoption of fully autonomous vehicles is only now becoming visible on the horizon, autonomous vehicle technology is gaining increasing popularity for assisted driving and other semi-autonomous vehicle operation. Developers within organizations such as major original equipment manufacturers, tier 1 suppliers, startup companies and others, are racing to develop autonomous vehicle and advanced driver assistance systems (ADAS) technologies. Such technologies are not limited to autonomous vehicles, but can also be used in robotics and other like applications.

Motion planning, or trajectory generation, for autonomous vehicles and other robots presents many challenges, especially given constraints such as obstacle avoidance, performance envelopes, and so on. To handle the various constraints, conventional solutions focus on trajectory optimization. These techniques often attempt to find a locally optimal solution, in which the motion planning problem is formulated as an optimization problem. In order to generate a trajectory that an autonomous vehicle can follow while respecting rules of the road, autonomous vehicle algorithms solve a nonlinear, non-convex optimization in real-time. Generic nonlinear optimization is a difficult problem to solve and success in finding a solution in real-time depends on having a suitable initial guess of the solution. This initial guess is often referred to as a "warm start" in the field of optimization. Finding an acceptable warm start for dynamic nonlinear optimization used in trajectory optimization is a challenging problem due to a constantly changing scene. Dynamic factors in the scene may include lane geometry, other traffic participants, road conditions, etc.

BRIEF SUMMARY OF THE DISCLOSURE

According to various embodiments of the disclosed technology a method of trajectory planning for an autonomous vehicle may include: generating a plurality of candidate trajectories, the candidate trajectories including a sequence of waypoints for the vehicle associated with corresponding time instances; computing features for each of the plurality of candidate trajectories; computing scores for the features of the candidate trajectories, wherein the scores are based on parameter values associated with their corresponding final trajectories; determining, based on the computed scores, a trajectory of the candidate trajectories to be used as a warm-start trajectory for trajectory optimization and applying the warm-start trajectory to develop a final trajectory for the vehicle; and partially or fully autonomously operating the autonomous vehicle in accordance with the final trajectory. Computing features for each of a plurality of candidate trajectories may include feature mapping to map each trajectory $\xi$ into a multi-dimensional feature vector. Computing scores for the features of the candidate trajectories may include predicting scores off-line based on data examples, and using this prediction on-line to select a subset of a smaller quantity of candidate trajectories, and determining the warm-start trajectory using only the selected subset of candidate trajectories.

The method may further include using candidate trajectories and their associated scene features as training data to train a machine learning module to predict scores for the candidate trajectories. The features may be associated with both the optimizer performance and the quality of the optimized trajectory under the warm-start candidate.

The method may further include generating a decision tree to determine an index for each of a plurality of determined warm start trajectory candidates offline and, during driving, using the decision tree to select the warm start candidate.

The method may further include using a machine learning module to predict a base ranking function used to compute the scores. The inputs to the machine learning module may include the candidate trajectories, and the features for the candidate trajectories. The machine learning module may compute optimal trajectories based on the candidate trajectories and computing scores for each of the optimal trajectories and generating a training set. Developing a final trajectory for the vehicle may include using the determined warm-start trajectory to initialize a trajectory optimization and using the trajectory optimization to determine the optimal trajectory. The training data set may include training samples for planning problems generated and solved during an autonomous test drive.

The method may further include selecting warm start candidate trajectories to be included in the plurality of candidate trajectories, the selection comprising ranking warm start candidate trajectories during in-vehicle autonomous operation or driving tests, prioritizing the warm start candidate trajectories according to their respective rankings, and choosing a subset of ranked warm start candidate trajectories as the plurality of candidate trajectories based on their respective rankings.

A vehicle control system for trajectory planning for an autonomous vehicle may include: a processor; and a memory coupled to the processor to store instructions, which when executed by the processor, cause the processor to perform operations, the operations including generating a plurality of candidate trajectories, the candidate trajectories including a sequence of waypoints for the vehicle associated with corresponding time instances; computing features for each of the plurality of candidate trajectories; computing scores for the features of the candidate trajectories, wherein the scores are based on parameter values associated with their corresponding final trajectories; determining, based on the computed scores, a trajectory of the candidate trajectories to be used as a warm-start trajectory for trajectory optimization and applying the warm-start trajectory to develop a final trajectory for the vehicle; and partially or fully autonomously operating the autonomous vehicle in accordance with the final trajectory. Computing features for each of a plurality of candidate trajectories may include feature mapping to map each trajectory into a multi-dimensional feature vector. Computing scores for the features of the candidate trajectories may include predicting scores off-line based on data examples, and using this prediction on-line to select a subset of a smaller quantity of candidate trajectories, and determining the warm-start trajectory using only the selected subset of candidate trajectories.

The operations may further include using candidate trajectories and their associated scene features as training data to train a machine learning module to predict scores for the candidate trajectories.

The operations may further include generating a decision tree to determine an index for each of a plurality of determined warm start trajectory candidates offline and, during driving, using the decision tree to select the warm start candidate.

The operations may further include using a machine learning module to approximate a base ranking function used to compute the scores. The inputs to the machine learning module may include the candidate trajectories, and the features for the candidate trajectories. The machine learning may include computing optimal trajectories based on the candidate trajectories and computing scores for each of the optimal trajectories and generating a training set. Developing a final trajectory for the vehicle may include using the determined warm-start trajectory to initialize a trajectory optimization and using the trajectory optimization to determine the optimal trajectory. The training data set may include training samples for planning problems generated and solved during an autonomous test drive.

The operations may further include selecting warm start candidate trajectories to be included in the plurality of candidate trajectories, the selection comprising ranking warm start candidate trajectories during in-vehicle autonomous operation or driving tests, prioritizing the warm start candidate trajectories according to their respective rankings, and choosing a subset of ranked warm start candidate trajectories as the plurality of candidate trajectories based on their respective rankings.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
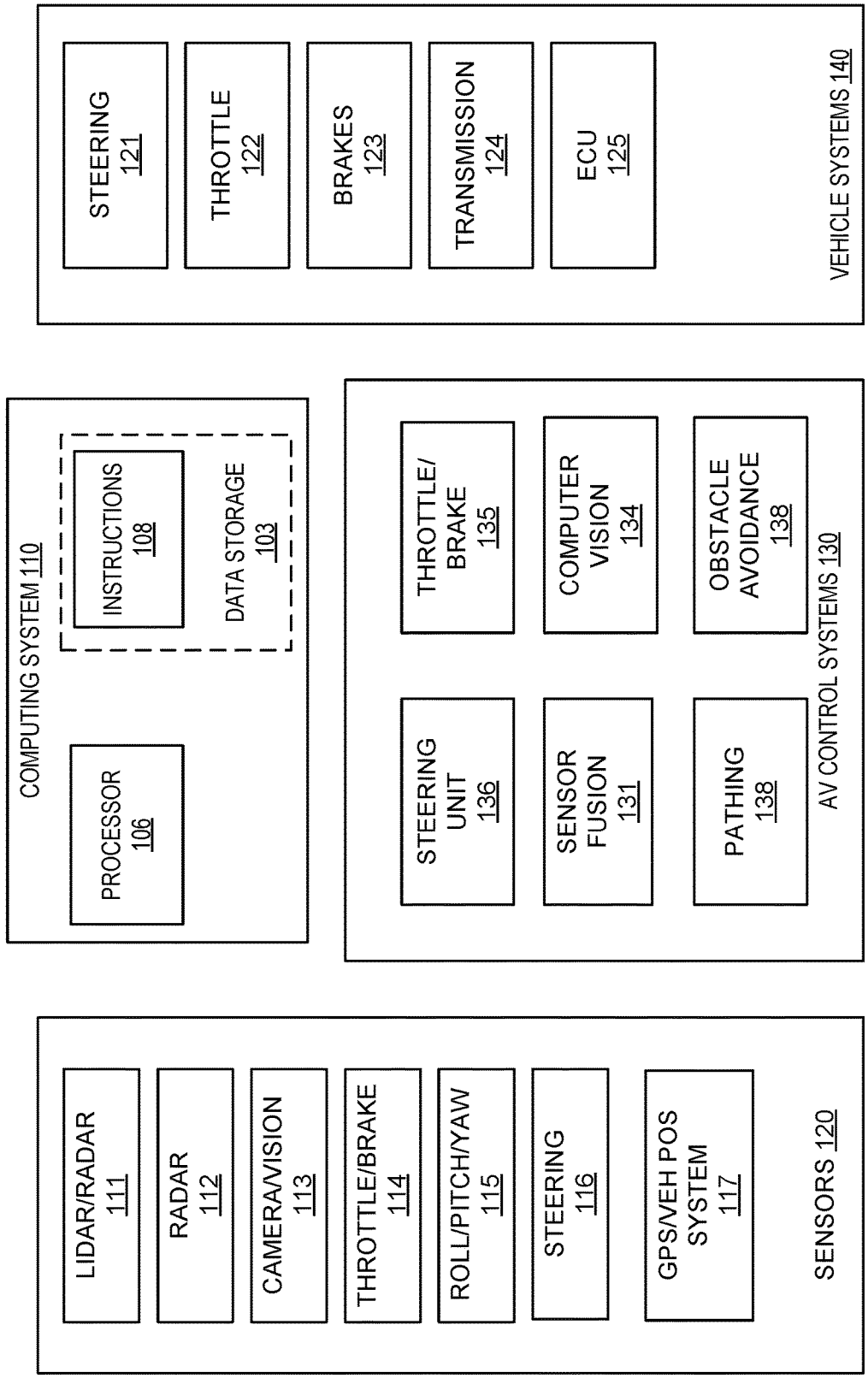
FIG. 1 illustrates an example autonomous or semi-autonomous vehicle with which embodiments of the disclosed technology may be implemented.

The figures are not exhaustive and do not limit the present disclosure to the precise form disclosed.

DETAILED DESCRIPTION

A goal of trajectory planning for autonomous vehicles is to generate maneuvers and trajectories that a physical vehicle can follow in order to remain within road boundaries, avoid collisions with other traffic participants, follow the mission to reach a desired destination and provide a comfortable ride for the passengers. For trajectory optimization, an initial trajectory can be provided as an initial solution. With a goal of allowing the solver to converge on an optimal solution more quickly, the initial solution may be chosen as one that is close to the final solution. An initial trajectory that is close to the optimal solution may be referred to as a "warm start" trajectory. This is in contrast to a "cold start" trajectory denoting an arbitrarily selected initial trajectory. The purpose of warm starting the optimization is to accelerate the process of finding optimal trajectory."

Embodiments of the systems and methods disclosed herein can provide for the use of machine learning techniques, such as automatically generated decision trees, for selecting a suitable warm start for trajectory optimization based on scene features as inputs. A warm start for trajectory optimization may be selected from a pool of pre-generated warm start candidates. Those candidates may include, for example, a previous solution, a stopping maneuver, a simple lane following maneuver etc. The criterion for determining the best candidate may be established through a learning process.

Autonomous driving data may be used to evaluate the outcome of each warm start off-line. A cost associated with each warm start may be specified based on criteria like solver convergence, the length of the final trajectory, etc. A preferred warm start can also be annotated (selected) by a human expert for an input into the learning process.

Selected warm start and scene features (lane width, vehicle speed, distance to other traffic participants and similar) may be used to train the machine learning module. In the case of a decision tree, this would select its structure and modify the selection parameters. The decision tree generated off-line may be used during on-line driving for fast selection of warm starts (initial trajectory guesses) for the trajectory optimizer.

The systems and methods disclosed herein may be implemented with any of a number of different autonomous or semi-autonomous vehicles and vehicle types. For example, the systems and methods disclosed herein may be used with cars, trucks, buses, construction vehicles and other on- and off-road vehicles. These can include vehicles for transportation of people/personnel, materials or other items. In addition, the technology disclosed herein may also extend to other vehicle types as well. An example Autonomous Vehicle (AV) in which embodiments of the disclosed technology may be implemented is illustrated in FIG. 1.

FIG. 1 illustrates an example autonomous or semi-autonomous vehicle with which embodiments of the disclosed technology may be implemented. In this example, vehicle 100 includes a computing system 110, sensors 120, AV control systems, 130 and vehicle systems 140. Vehicle 100 may include a greater or fewer quantity of systems and subsystems and each could include multiple elements. Accordingly, one or more of the functions of the technology disclosed herein may be divided into additional functional or physical components, or combined into fewer functional or physical components. Additionally, although the systems and subsystems illustrated in FIG. 1 are shown as being partitioned in a particular way, the functions of vehicle 100 can be partitioned in other ways. For example, various vehicle systems and subsystems can be combined in different ways to share functionality.

Sensors 120 may include a plurality of different sensors to gather data regarding vehicle 100, its operator, its operation and its surrounding environment. In this example, sensors 120 include lidar 111, radar 112, or other like the distance measurement sensors, image sensors 113, throttle and brake sensors 114, 3D accelerometers 115, steering sensors 116, and a GPS or other vehicle positioning system 117. One or more of the sensors 120 may gather data and send that data to the vehicle ECU or other processing unit. Sensors 120 (and other vehicle components) may be duplicated for redundancy.

Distance measuring sensors such as lidar 111, radar 112, IR sensors and other like sensors can be used to gather data to measure distances and closing rates to various external objects such as other vehicles, traffic signs, pedestrians, light poles and other objects. Image sensors 113 can include one or more cameras or other image sensors to capture images of the environment around the vehicle as well as internal to the vehicle. Information from image sensors 113 can be used to determine information about the environment surrounding the vehicle 100 including, for example, information regarding other objects surrounding vehicle 100. For example, image sensors 113 may be able to recognize landmarks or other features (including, e.g., street signs, traffic lights, etc.), slope of the road, lines on the road, curbs, objects to be avoided (e.g., other vehicles, pedestrians, bicyclists, etc.) and other landmarks or features. Information from image sensors 113 can be used in conjunction with other information such as map data or information from positioning system 117 to determine, refine or verify vehicle location.

Throttle and brake sensors 114 can be used to gather data regarding throttle and brake application by a human or autonomous operator. Accelerometers 115 may include a 3D accelerometer to measure roll, pitch and yaw of the vehicle. Accelerometers 115 may include any combination of accelerometers and gyroscopes for the vehicle or any of a number of systems or subsystems within the vehicle to sense position and orientation changes based on inertia.

Steering sensors 116 (e.g., such as a steering angle sensor) can be included to gather data regarding steering input for the vehicle by a human or autonomous operator. A steering sensor may include a position encoder monitor the angle of the steering input in degrees. Analog sensors may collect voltage differences that can be used to determine information about the angle and turn direction, while digital sensors may use an LED or other light source to detect the angle of the steering input. A steering sensor may also provide information on how rapidly the steering wheel is being turned. A steering wheel being turned quickly is generally normal during low-vehicle-speed operation and generally unusual at highway speeds. If the driver is turning the wheel at a fast rate while driving at highway speeds the vehicle computing system may interpret that as an indication that the vehicle is out of control. Steering sensor 116 may also include a steering torque sensor to detect an amount of force the driver is applying to the steering wheel.

Vehicle positioning system 117 (e.g., GPS or other positioning system) can be used to gather position information about a current location of the vehicle as well as other positioning or navigation information.

Although not illustrated, other sensors 120 may be provided as well. Various sensors 120 may be used to provide input to computing system 110 and other systems of vehicle 100 so that the systems have information useful to operate in an autonomous, semi-autonomous or manual mode.

AV control systems 130 may include a plurality of different systems/subsystems to control operation of vehicle 100. In this example, AV control systems 130 include steering unit 136, throttle and brake control unit 135, sensor fusion module 131, computer vision module 134, pathing module 138, and obstacle avoidance module 139. Sensor fusion module 131 can be included to evaluate data from a plurality of sensors, including sensors 120. Sensor fusion module 131 may use computing system 110 or its own computing system to execute algorithms to assess inputs from the various sensors.

Throttle and brake control unit 135 can be used to control actuation of throttle and braking mechanisms of the vehicle to accelerate, slow down, stop or otherwise adjust the speed of the vehicle. For example, the throttle unit can control the operating speed of the engine or motor used to provide motive power for the vehicle. Likewise, the brake unit can be used to actuate brakes (e.g, disk, drum, etc.) or engage regenerative braking (e.g., such as in a hybrid or electric vehicle) to slow or stop the vehicle.

Steering unit 136 may include any of a number of different mechanisms to control or alter the heading of the vehicle. For example, steering unit 136 may include the appropriate control mechanisms to adjust the orientation of the front or rear wheels of the vehicle to accomplish changes in direction of the vehicle during operation. Electronic, hydraulic, mechanical or other steering mechanisms may be controlled by steering unit 136.

Computer vision module 134 may be included to process image data (e.g., image data captured from image sensors 113, or other image data) to evaluate the environment within or surrounding the vehicle. For example, algorithms operating as part of computer vision module 134 can evaluate still or moving images to determine features and landmarks (e.g., road signs, traffic lights, lane markings and other road boundaries, etc.), obstacles (e.g., pedestrians, bicyclists, other vehicles, other obstructions in the path of the subject vehicle) and other objects. The system can include video tracking and other algorithms to recognize objects such as the foregoing, estimate their speed, map the surroundings, and so on.

Pathing module 138 may be included to compute a desired path for vehicle 100 based on input from various other sensors and systems. For example, pathing module 138 can use information from positioning system 117, sensor fusion module 131, computer vision module 134, obstacle avoidance module 139 (described below) and other systems to determine a safe path to navigate the vehicle along a segment of a desired route. Pathing module 138 may also be configured to dynamically update the vehicle path as realtime information is received from sensors 120 and other control systems 130.

Obstacle avoidance module 139 can be included to determine control inputs necessary to avoid obstacles detected by sensors 120 or AV control systems 130. Obstacle avoidance module 139 can work in conjunction with pathing module 138 to determine an appropriate path to avoid a detected obstacle.

Vehicle systems 140 may include a plurality of different systems/subsystems to control operation of vehicle 100. In this example, AV control systems 130 include steering system 121, throttle system 122, brakes 123, transmission went 24, electronic control unit (ECU) 125 and propulsion system 126. These vehicle systems 140 may be controlled by AV control systems 130 in autonomous, semi-autonomous or manual mode. For example, in autonomous or semi-autonomous mode, AV control systems 130, alone or in conjunction with other systems, can control vehicle systems 140 to operate the vehicle in a fully or semi-autonomous fashion. This may also include an assist mode in which the vehicle takes over partial control or activates ADAS controls to assist the driver with vehicle operation.

Computing system 110 in the illustrated example includes a processor 106, and memory 103. Some or all of the functions of vehicle 100 may be controlled by computing system 110. Processor 106 can include one or more GPUs, CPUs, microprocessors or any other suitable processing system. Processor 106 may include one or more single core or multicore processors. Processor 106 executes instructions 108 stored in a non-transitory computer readable medium, such as memory 103.

Memory 103 may contain instructions (e.g., program logic) executable by processor 106 to execute various functions of vehicle 100, including those of vehicle systems and subsystems. Memory 103 may contain additional instructions as well, including instructions to transmit data to, receive data from, interact with, and/or control one or more of the sensors 120, AV control systems, 130 and vehicle systems 140. In addition to the instructions, memory 103 may store data and other information used by the vehicle and its systems and subsystems for operation, including operation of vehicle 100 in the autonomous, semi-autonomous or manual modes.

Although one computing system 110 is illustrated in FIG. 1, in various embodiments multiple computing systems 110 can be included. Additionally, one or more systems and subsystems of vehicle 100 can include its own dedicated or shared computing system 110, or a variant thereof. Accordingly, although computing system 110 is illustrated as a discrete computing system, this is for ease of illustration only, and computing system 110 can be distributed among various vehicle systems or components.

Vehicle 100 may also include a wireless communication system (not illustrated) to communicate with other vehicles, infrastructure elements, cloud components and other external entities using any of a number of communication protocols including, for example, V2V, V2I and V2X protocols. Such a wireless communication system may allow vehicle 100 to receive information from other objects including, for example, map data, data regarding infrastructure elements, data regarding operation and intention of surrounding vehicles, and so on. A wireless communication system may also allow vehicle 100 to transmit information to other objects. In some applications, computing functions for various embodiments disclosed herein may be performed entirely on computing system 110, distributed among two or more computing systems 110 of vehicle 100, performed on a cloud-based platform, performed on an edge-based platform, or performed on a combination of the foregoing.

The example of FIG. 1 is provided for illustration purposes only as one example of vehicle systems with which embodiments of the disclosed technology may be implemented. One of ordinary skill in the art reading this description will understand how the disclosed embodiments can be implemented with this and other vehicle or platforms and with other robots.

The example of FIG. 1 is are provided for illustration purposes only as examples of vehicle systems with which embodiments of the disclosed technology may be implemented. One of ordinary skill in the art reading this description will understand how the disclosed embodiments can be implemented with vehicle platforms.

Figure 2:
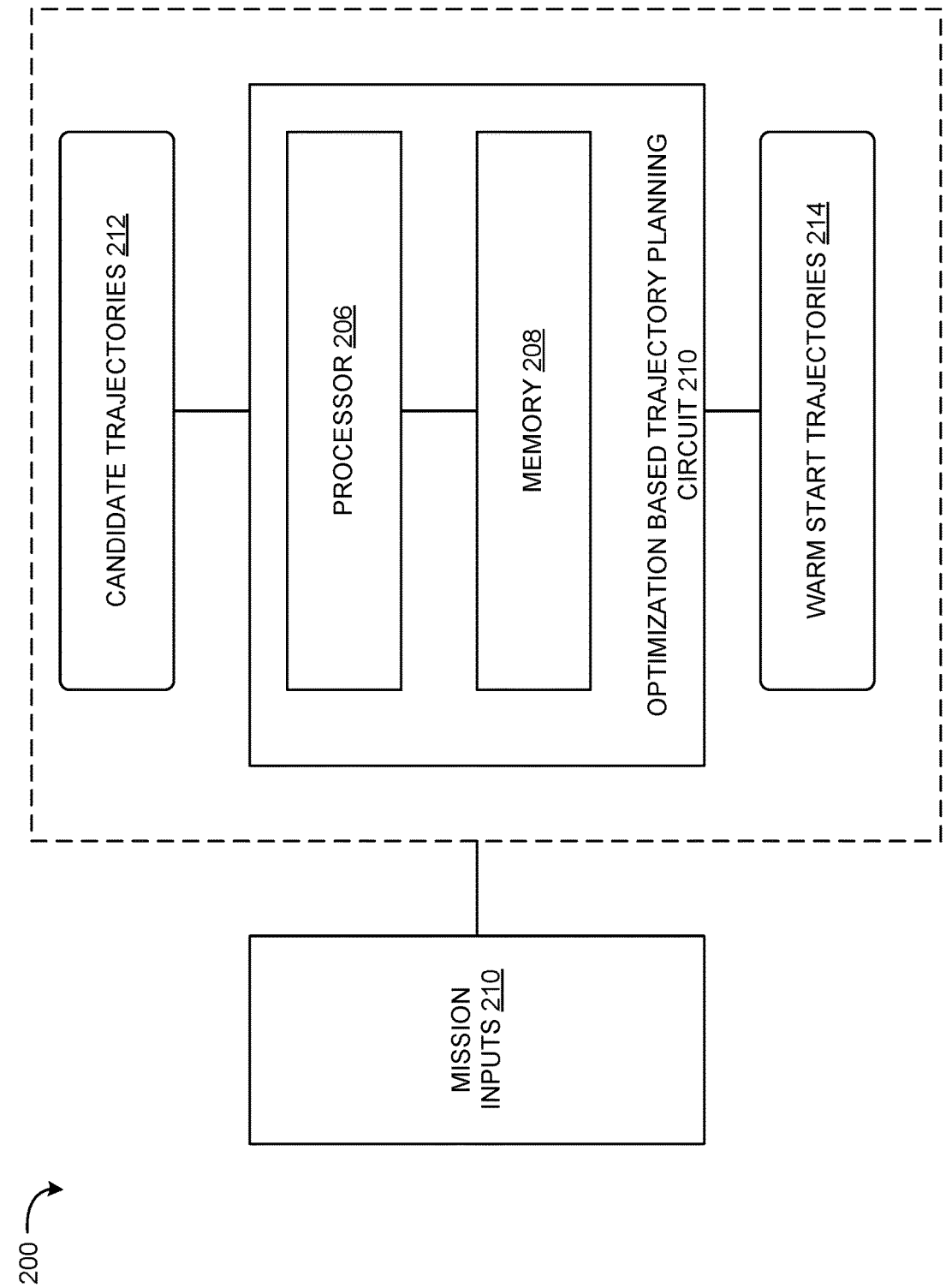
FIG. 2 illustrates an example architecture for Optimization-based trajectory planning in accordance with embodiments of the systems and methods described herein.

FIG. 2 illustrates an example architecture for Optimization-based trajectory planning in accordance with one embodiment of the systems and methods described herein. Referring now to FIG. 2, in this example, trajectory planning system 200 includes an optimization-based trajectory planning circuit 210 that receives mission inputs 210 and outputs warm start trajectories 214.

Trajectory planning circuit 210 may include a communication circuit (not shown), a processor 206 and a memory 208. Processor 206 can include one or more GPUs, CPUs, microprocessors, or any other suitable processing system. Processor 206 may include a single core or multicore processors. The memory 208 may include one or more various forms of memory or data storage (e.g., flash, RAM, etc.) that may be used to store the calibration parameters, images (analysis or historic), point parameters, instructions and variables for processor 206 as well as any other suitable information. Memory 208, can be made up of one or more modules of one or more different types of memory, and may be configured to store data and other information as well as operational instructions that may be used by the processor 206 to trajectory planning circuit 210.

Although the example of FIG. 2 is illustrated using processor and memory circuitry, as described below with reference to circuits disclosed herein, trajectory planning circuit 210 can be implemented utilizing any form of circuitry including, for example, hardware, software, or a combination thereof. By way of further example, one or more processors, controllers, ASICs, PLAs, PALs, CPLDs, FPGAs, logical components, software routines or other mechanisms might be implemented to make up a trajectory planning circuit 210.

Trajectory planning circuit 210 may include either or both a wireless transceiver circuit with an associated antenna and a wired I/O interface with an associated hardwired data port (not illustrated). Accordingly, communications with trajectory planning circuit 210 can include either or both wired and wireless communications.

During operation, trajectory planning circuit 210 can receive information such as, for example, mission inputs 210 and candidate trajectories 212. Mission inputs 210 may include parameters, and other data and information that may be used to define a mission for an autonomous vehicle. This may include, for example, routing information and planning problems. Inputs may also include any constraints on trajectory planning. Candidate trajectories 212 can include candidates a set of precomputed candidate trajectories that may be suitable candidates for the warm-start trajectory. Trajectory planning circuit 210 may be implemented as a machine learning model that may be trained off-line using manufactured data or using data obtained during one or more autonomous driving experiments.

A trajectory planner module (e.g., trajectory planning circuit 210) computes a trajectory for an autonomous vehicle or other robot. A trajectory includes a sequence of future states to be visited by the vehicle, and may be parameterized by factors such as time, travelled distance and other parameters. Accordingly, a trajectory may be a sequence of waypoints $\{w_i\}$=0, . . . , N, each associated with a time instance, $t_i$. Time instance, $t_i$, may range in some examples from some initial time to to a planning horizon look-ahead time $t_N$. The waypoints may be vectors typically consisting of vehicle Cartesian coordinates, heading angle (orientation), velocity and acceleration. If the waypoint time evolution is governed by some dynamics equations, the waypoints may be referred to as state vectors or states.

An optimization-based motion plan may be formulated in its generic discrete-time form as:

$$\min_{u_0, u_{N-1}} J(w, u) = \ell_N(w_N(t_N)) + \sum_{i=0}^{N-1} \ell_i(w_i, u_i) \quad (1a)$$

$$\text{subject to}: w_{i+1} = f(w_i, u_i), \quad (1b)$$

$$(w_i, u_i) \in C_i, \quad i = 0, \ldots, N-1, \quad (1c)$$

$$w_N \in C_N., \quad (1d)$$

Where (1a) represents the cost function that is being optimized (in this case—minimized) by a selection of control inputs $\{u_i\}$; (1b) represents dynamics equations derived from the vehicle dynamics model, that define how the control inputs affect the evolution of waypoints (states) and (1c)-(1d) define constraints on waypoints (states) and on control variables.

Embodiments represent an improvement over conventional systems for trajectory optimization. One improvement that may be achieved with embodiments of optimization-based planning with states, control inputs and dynamics constraints (1b)-(1d) is that the optimal trajectory $\{w_i^*\}$ is designed to respect vehicle dynamics and constraints, and as such can be followed by a physical vehicle, resulting in increased ride safety and comfort.

An improvement in the operation of the optimization system is that the trajectory optimization problem such as that set forth in Equation (1) may, in various embodiments, be solved reliably and within a predictable time interval for a computational platform on which the optimization is executed. Trajectory optimization may be implemented in various embodiments as a gradient-based numerical procedure that iteratively improves the trajectory from the initial trajectory toward the optimal solution. Each iteration of the procedure attempts to improve the cost value and bring the trajectory states and control inputs within constraints. Iterative optimization procedures that comply with the aforementioned real-time constraints may be able to guarantee that only the nearest optimal solution is found. This nearest optimal solution may be referred to as locally optimal to indicate that it may not be the solution with the best possible cost value within the constraints. The best possible cost value within the constraints may be referred to as the globally optimal solution.

In order to improve the efficiency of the iterative trajectory optimization and reduce sub-optimality of computed local solutions, the initial trajectory from which the iterations start should be selected as one that is close to (and maybe even as close as possible to) the desired optimal solution. Such a "nearby solution" is often referred to as a warm start of the optimization procedure.

Requirements for a warm start trajectory may include requirements that they satisfy the dynamic constraints (1b) and the state and control input constraints (1c)-(1d). Also, computational costs required for finding a warm start candidate should be sufficiently smaller than the expected computational cost required for optimizing the trajectory to the optimal solution with trivial or randomly generated initial guesses.

Warm start trajectories can be pre-computed and stored, or the optimal trajectory computed in a previous planning cycle can be re-used. If multiple initial trajectories are available as warm start candidates, the trajectory optimization problem can be solved for each candidate, and the solution that yields the best optimal cost selected. This may help finding a solution closer to a globally optimal solution, at the expense of more computational resources used for solving several trajectory optimization problems in parallel. This complexity can be reduced by having a method that selects a single, preferably the best, warm start out of several candidates.

Consider a set of trajectories as warm start candidates $\{\xi_i\}_{i=1}^{n_c}$. Each trajectory $\xi$ may include a sequence of waypoints (states): $\xi = \{w_i\}_{i=0}^{N}$, where each state vector $w_i \in \mathbb{R}^n$. States are assumed to satisfy the state update equations (1b). The space of trajectories consisting of N waypoints is denoted as $\chi_N$. Let g: $\chi_N \to \mathbb{R}^d$ denote the feature mapping, which maps a trajectory $\xi$ into a d-dimensional feature vector. A base ranking function may be used to assign a score to the vector of features and define a full-ordering in the space of trajectories.

Figure 3:
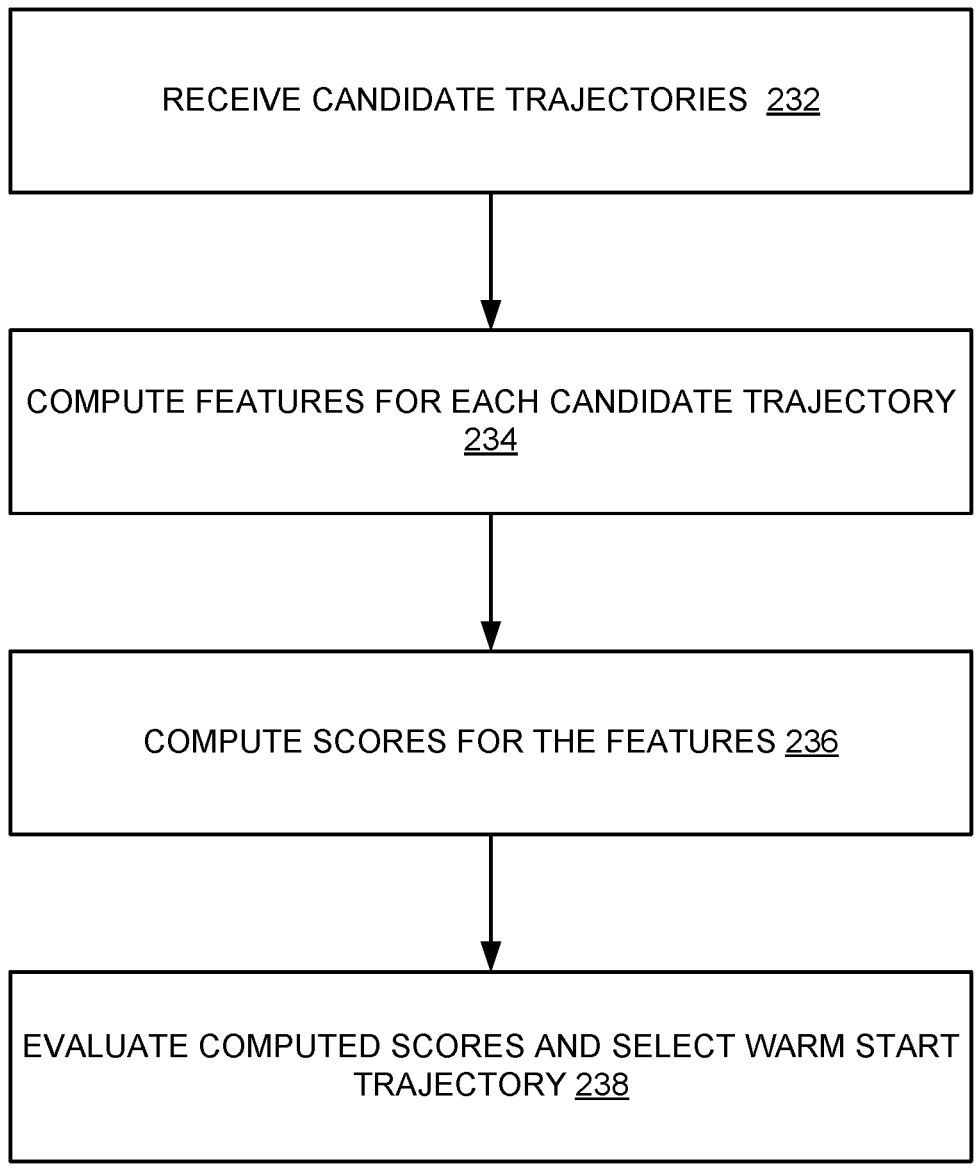
FIG. 3 illustrates an example process for a warm start calculation in accordance with embodiments of the systems and methods described herein.

FIG. 3 illustrates an example process for a warm start calculation in accordance with embodiments. In this example process, a number of candidate trajectories (e.g., candidate trajectories 212 in the example of FIG. 2) are obtained and compared to determine the most desirable trajectory. At operation 232 the system receives candidate trajectories $\{\xi_i\}_{i=1}^{n_c}$. In various embodiments, candidate trajectories are precomputed candidates. A candidate trajectory may be any trajectory that satisfies vehicle dynamics, such as a trivial stopped trajectory consisting of all 0 states, an optimal trajectory from the previous cycle, or an analytically calculated stopping or accelerating maneuver following previously executed optimal trajectory or road curvature. As noted, each trajectory, $\xi$, may include a sequence of waypoints $\{w_i\}$, i=0, . . . , N. Each waypoint, or state, may be associated with a time instance, $t_i$. The time instances for the sequence of waypoints can range from an initial time, $t_0$, to an end time, $t_N$. The end time can be chosen as the planning horizon look-ahead. The waypoints are vectors $\xi = \{w_i\}_{i=0}^{N}$, and each state vector $w_i \in \mathbb{R}^n$, and may include vehicle Cartesian coordinates, heading angle (orientation), velocity and acceleration.

At operation 234, the system computes features $\{\phi_i = g(\xi_i)\}_{i=1}^{n_c}$ for each of the trajectories. In various embodiments this can be performed as a feature mapping to map each trajectory $\xi$ into a d-dimensional feature vector. Features may include elements of the associated scene of the trajectory, such as lane width, vehicle speed, distance to other traffic participants and the like.

At operation 236, the system computes scores for each feature, $\phi$, as $\{s_i = \rho(\phi_i)\}_{i=1}^{n_c}$. The base ranking function $\rho(\cdot)$ may be unknown and learned from data. A base ranking function $\rho: \mathbb{R}^d \to \mathbb{R}$ may be implemented to assign a score $s \in \mathbb{R}$ to the vector of features $\phi \in \mathbb{R}^d$ and define a full-ordering in the space of trajectories:

$$\xi_i \geq \xi_j = \rho(g(\xi_i)) \geq \rho(g(\xi_j)).$$

Base ranking function $\rho(\cdot)$ may be implemented to quantify the "goodness" of each specific warm start for solving the trajectory optimization problem. In various embodiments, it is designed to assign higher scores to warm start candidates that result in a more desirable final trajectories. This might be accomplished, for example, by looking at parameter values such as lower optimal cost, feasibility with respect to constraints (e.g., constraints (1c)-(1d)), shorter time to solve the problem, smaller number of solver iterations etc.

An exact evaluation of the base ranking function $\rho(\cdot)$ in various embodiments may be accomplished by solving the trajectory optimization problem for all warm start candidate trajectories and choosing the one with the highest score. Accordingly, at operation 238, the system evaluates the computed scores to determine warm start trajectory $\xi_k^*$ with largest score, where $k^*=\min\{k: s_k \geq s_j, j=1, \ldots n_c\}$.

In various implementations this can be achieved by solving the trajectory optimization problems for different warm start trajectories in parallel, however this approach relies on a large number of parallel computational units. Accordingly, in other embodiments, the system may be configured to approximate the ranking function by learning it off-line from data examples, and using this approximation on-line to efficiently select a single or a smaller number of top ranking warm start candidates, and then proceed to solve the full trajectory optimization problems only for the selected subset of the most promising candidates.

A ranking function approximation constructed in an off-line training process as described above, may be used to rank warm start candidate trajectories during in-vehicle autonomous operation or driving tests. The ranking of trajectories provides the means to prioritize the warm start candidates. Once prioritized, higher ranked candidates can be chosen to form a smaller subset of the candidates that are likely to yield a good solution. In some embodiments, the system may choose only a single, top ranked candidate, while in other embodiments, the system may be configured to choose a plurality of top ranked candidates. A prioritization based on the use of approximate ranking functions allows for more efficient operation and more rapidly finding a better solution, because a smaller quantity (one or multiple) of best candidate trajectories are used to initialize the solution of the planning problem. This is in contrast to embodiments that may select warm start candidates arbitrarily, based on heuristics, or solving a single planning problem multiple times for different initial trajectories and then selecting the best solution.

As noted above, embodiments may begin with selecting warm start candidate trajectories. Embodiments may consider candidate trajectory features when selecting the candidate trajectories. A feature vector $\phi_i \in \mathbb{R}^d$ associated with the trajectory $\xi_i$ by the mapping $\phi_i = g(\xi_i)$ may be a vector of quantitative characteristics of the trajectory. In various embodiments, the machine learning process may include selecting the relevant features. Embodiments may be implemented to use the cost function (1a) and its components evaluated for the specific trajectory to define the feature vector that represents that trajectory.

Various embodiments may consider, for example, the total cost $J(w, u)$ (e.g., in accordance with equation (1a)) and maximal absolute violation of constraints, such as constraints (1c)-(1d). In other embodiments, each stage cost $\ell(\cdot)$ in (1a) is often a weighted sum of several components targeting specific behavior:

$$\ell_i(w, u) = \sum_{k=1}^{n_l} \alpha_k \ell_{ik}(w, u), \quad i = 0, \ldots, N-1. \tag{2}$$

Components $\ell_{ik}$ promote or regulate behaviors such as, for example, lane following, maintaining a safe distance from obstacles, motion progress along the lane, comfort metrics etc. Warm start candidate features may include a function of specific components $\ell(\cdot)_{ik}$ evaluated for the trajectory candidate, at all stages or selected stages $i=0, \ldots, N$.

Further embodiments may use a norm of gradients of the total cost, constraints, or specific cost components.

It is noted that the feature map $g(\cdot)$ may be closely related to the specific planning problem and the specific elements of the stage cost and its parameters. To indicate this relation, the feature mapping for a specific trajectory planning problem $\pi$ is designated herein as $g_\pi(\cdot)$.

Warm start selection criteria may measure the benefits to the optimization outcome when a specific warm start candidate is used to initialize the optimization procedure. Such criteria may include in one embodiment the final total cost value in which a solution resulting in lower cost of (1) is preferred. Other embodiments may include a maximal absolute violation of constraints (1c)-(1d), in which feasible solutions with low or no constraint violations are preferred. In further embodiments, the criteria may include the total number of optimization procedure iterations, in which solutions with lower numbers of iterations are preferred. The criteria might include the total solution time, in which solutions obtained within shorter time intervals are preferred. Still further embodiments may include the distance of the end trajectory to the locally optimal solutions, in which end trajectories with smaller convergence criteria (e.g. the norm of the Lagrangian) are preferred.

As noted above, various embodiments may use a machine learning model to approximate the base ranking function $\rho(\cdot)$, which computes the warm start candidate score and induces the full ordering on the space of trajectories $X_N$. Parameters of the machine learning model may be computed using a supervised training procedure from the data obtained during autonomous driving tests. This may be possible in various embodiments because the fitness score for any trajectory can be exactly computed.

Figure 4:
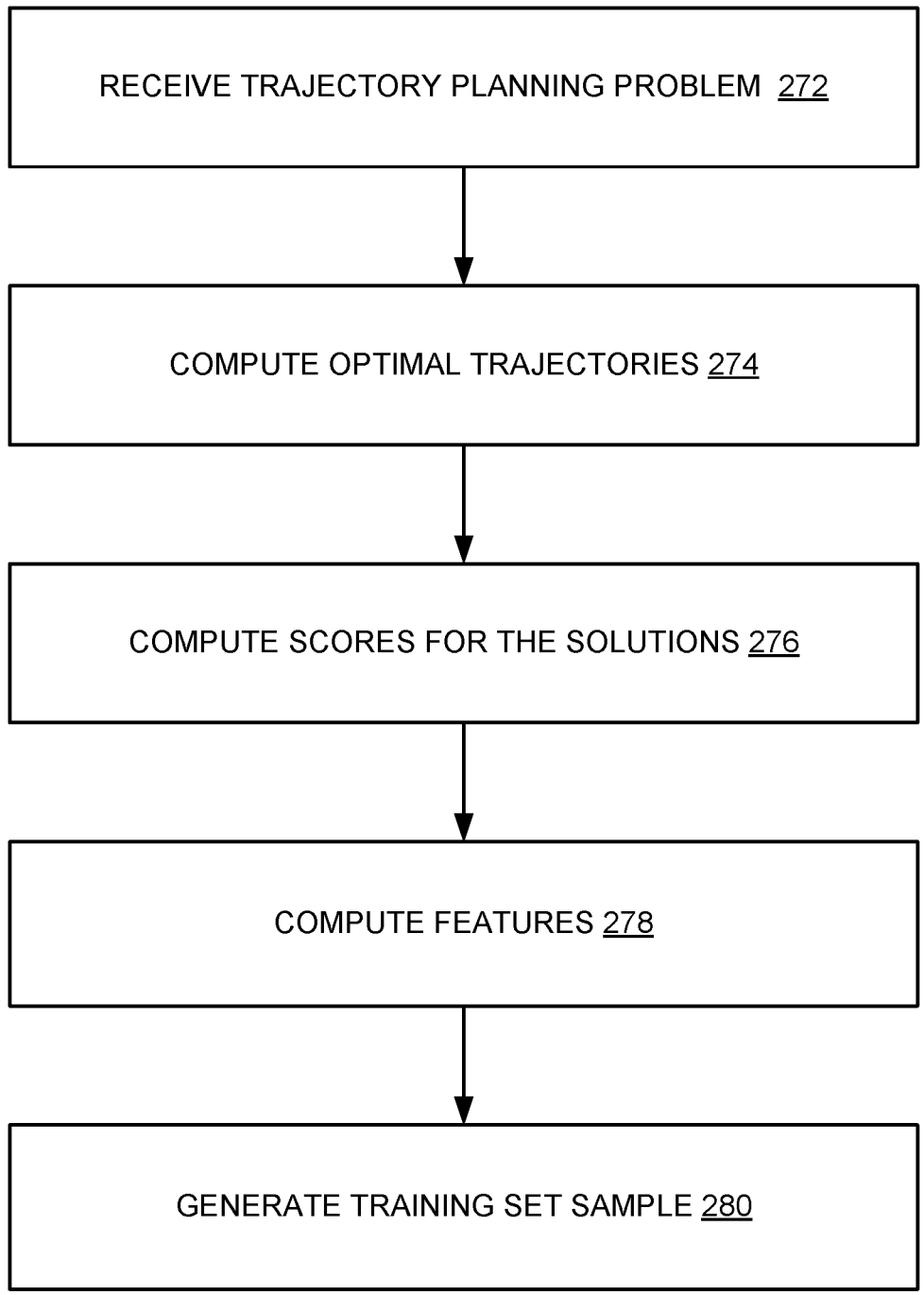
FIG. 4 illustrates an example process for training data generation in accordance with various embodiments of the systems and methods described herein.

FIG. 4 illustrates an example process for training data generation to compute parameters of the machine learning model in accordance with various embodiments. Particularly, the example of FIG. 4 illustrates training data generation for a single trajectory planning problem $\pi$. The training data set generated includes the feature vector $\{\phi_i = g_\pi(\xi_i)\}_{i=1}^{n_c}$ for the trajectory candidate selected as a warm start, a score $s^*$ associated with the selected trajectory candidate, and the index $i^*$ of the selected trajectory. The process may be repeated for multiple planning problems $\{\pi_i\}_{i=1}^{n_p}$ collected during the autonomous test drive, where $n_p$ is the number of all relevant planning problems generated and solved during the autonomous test drive. Accordingly, a training data set, $(\phi_i, s^*, i^*)$, may be computed for each of the selected candidate trajectories and for each of the multiple planning problems $\{\pi_i\}_{i=1}^{n_p}$.

Referring now to FIG. 4, at operation 272 the system receives a trajectory planning problem, $\pi$. In various embodiments, system inputs included for machine learning for the warm start selection may include candidate warm start trajectories $\{\xi_i\}_{i=1}^{n_c}$, the planning problem $\pi$ and feature mapping $g_\pi(\cdot)$.

An operation 274, the system computes an optimal trajectory $\{\xi_i^*\}_{i=1}^{n_c}$ for each of the candidate warm start trajectories for the trajectory planning problem. These optimal trajectories may be computed, for example, by solving the planning problem $\pi$ starting from each of the warm start trajectories $\{\xi_i\}_{i=1}^{n_c}$. At operation 276, the system computes a score $\{s_i\}_{i=1}^{n_c}$ for each of the generated solutions $\{\xi_i^*\}_{i=1}^{n_c}$. The system evaluates the scores to find the maximal score s* and the index i* as follows:

$$s^* = \max_{i=1,\ldots,n_c} s_i,$$

$$i^* = \arg\max_{i=1,\ldots,n_c} s_i.$$

At operation 278, the system computes a feature vector for each of the candidate warm start trajectories as $\{\phi_i = g_\pi(\xi_i)\}_{i=1}^{n_c}$, for the planning problem $\pi$.

At operation 280, the system generates the training set sample. The training data may include the feature vector $\{\phi_i = g_\pi(\xi_i)\}_{i=1}^{n_c}$ for the trajectory candidate selected as a warm start, the score s* associated with the selected trajectory candidate, and the index i* of the selected trajectory—($\phi_i$, s*, i*).

The process such as that shown in FIG. 4 may be implemented to generate a single training data set for a given trajectory planning problem $\pi$. This process may be repeated for multiple planning problems and the corresponding dataset, ($\phi_i$, s*, i*), computed for each planning problem. The collection of datasets for all the planning problems may then be used to learn the ranking functions. Accordingly, the training data set may include training samples for planning problems $\{\pi i\}$np, where np is the number of all relevant planning problems generated and solved during an autonomous test drive.

In various embodiments, feature mapping g(•) may be defined for a planning problem class defined by specific structure of the cost (e.g., (1a)) and its parameters. Once the warm start selection has been trained, results will be better where the planning problems for which it is used preserve the same cost and cost parameters as those planning problems used for training data set generation. Any modification of the cost structure or significant changes in the cost parameters (e.g., a change in the weights $\alpha_k$ in equation (2)) may require retraining of the warm start selector with training data generated for planning problems with the updated cost function.

As one alternative, the warm start selection can be implemented as a neural network with a continuous score input. This may be implemented, for example, by providing a plurality of feature vectors for the warm start candidates. For example, embodiments may provide one feature vector for each warm start candidate trajectory $\xi_i$. The neural network, or some other nonlinear function approximator, can output a plurality of scores $s_i$ for each warm start candidate trajectory $\xi_i$. One advantage of using a neural network and a score $s_i$ as an output in various embodiments is that the base ranking function $\rho(\cdot)$ may be explicitly approximated. This may allow the application of such a warm start selector to utilize arbitrary candidate trajectories, including the warm start candidates that were not used in generation of the training data set. The system can use any set of warm start candidates and will provide a score for any candidate trajectory provided. Based on the scalar score, the best ranking trajectory candidate is selected from the pool of candidates that were evaluated. Such implementations may provide flexibility to allow additional removal of candidates from the pool during autonomous operation. A predetermined set of warm start candidates is not needed.

As another alternative, the warm start selector can be realized as a decision tree that maps the feature vector directly into the index of the selected warm start candidate i*. The decision tree or other ranking model accepts as its input a plurality of feature vectors for the warm start candidates. For example, embodiments may provide one feature vector for each warm start candidate trajectory $\xi_i$. The decision tree or ranking model directly outputs the index of the best warm start candidate. This is in contrast to the neural network, which outputs a continuous-valued score. Embodiments using a decision tree or other ranking model can provide the advantage of easier deployment and lower computational cost as compared to, say, neural networks. However, it may be considered less flexible in that the number and ordering of the warm start candidates must be the same as it was during the training process. Accordingly, this approach may be limited in the sense that only the warm start candidates used during the training data set generation can be used during the deployment, and adding a new warm start candidate may require the data generation procedure in FIG. 3 and the training procedure to be repeated. An advantage that might be realized by using decision trees over a neural network could be a lower computational requirement, depending on the implementation. For example, the ranking can be performed off-line, and the results loaded onto the vehicle for vehicle operations.

Figure 5:
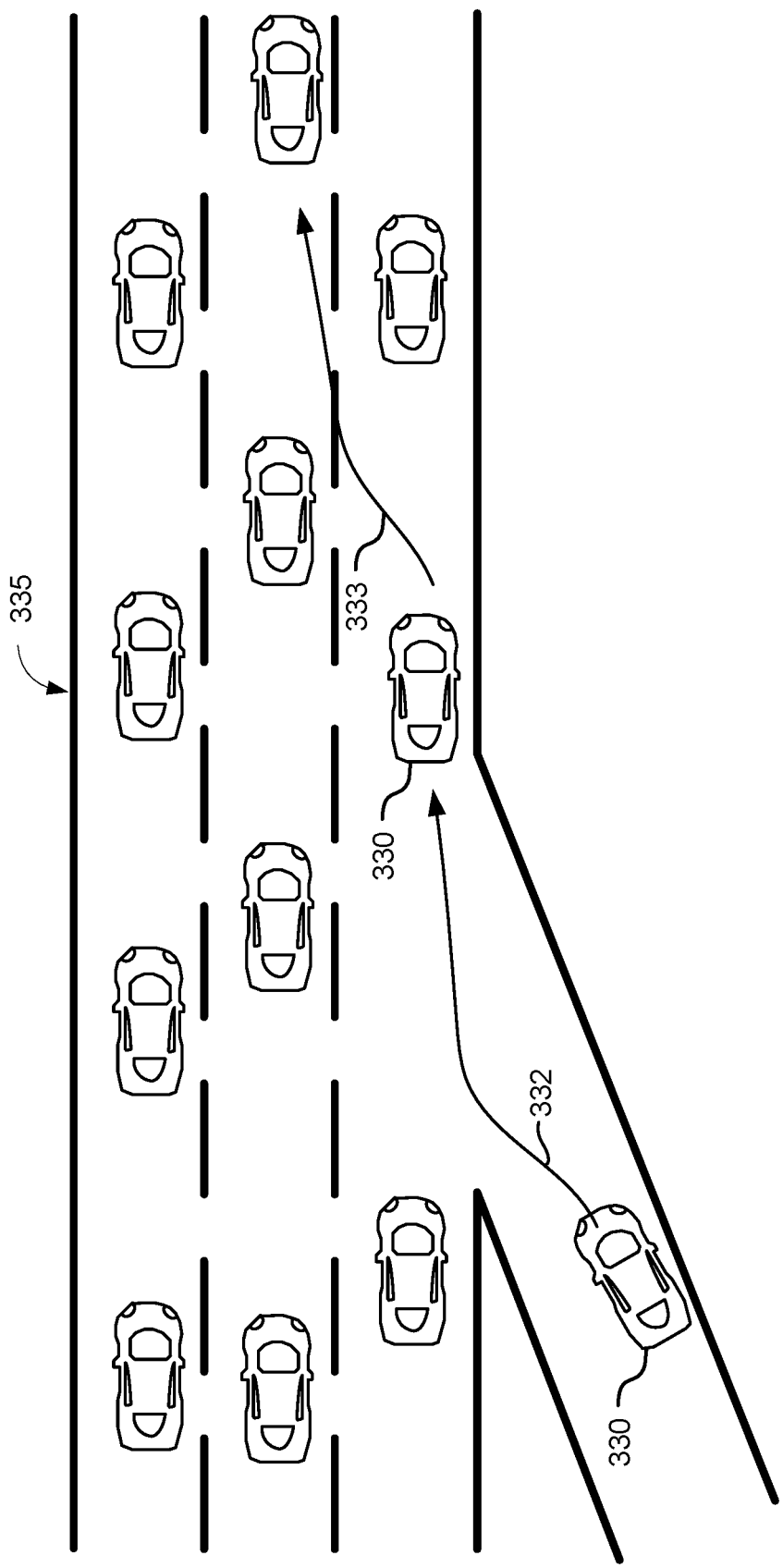
FIG. 5 illustrates an example of a plurality of trajectories that might be used as part of a mission in accordance with embodiments of the systems and methods described herein.

FIG. 5 illustrates an example of a plurality of trajectories that might be used as part of a mission. In this example, as a part of its mission, ego vehicle 330 is merging onto a highway 335. An example trajectory for this is illustrated as 332. At a subsequent time, ego vehicle 330 is merging from Lane number three of the highway into Lane number two. An example trajectory for this illustrated at 333.

Figure 6:
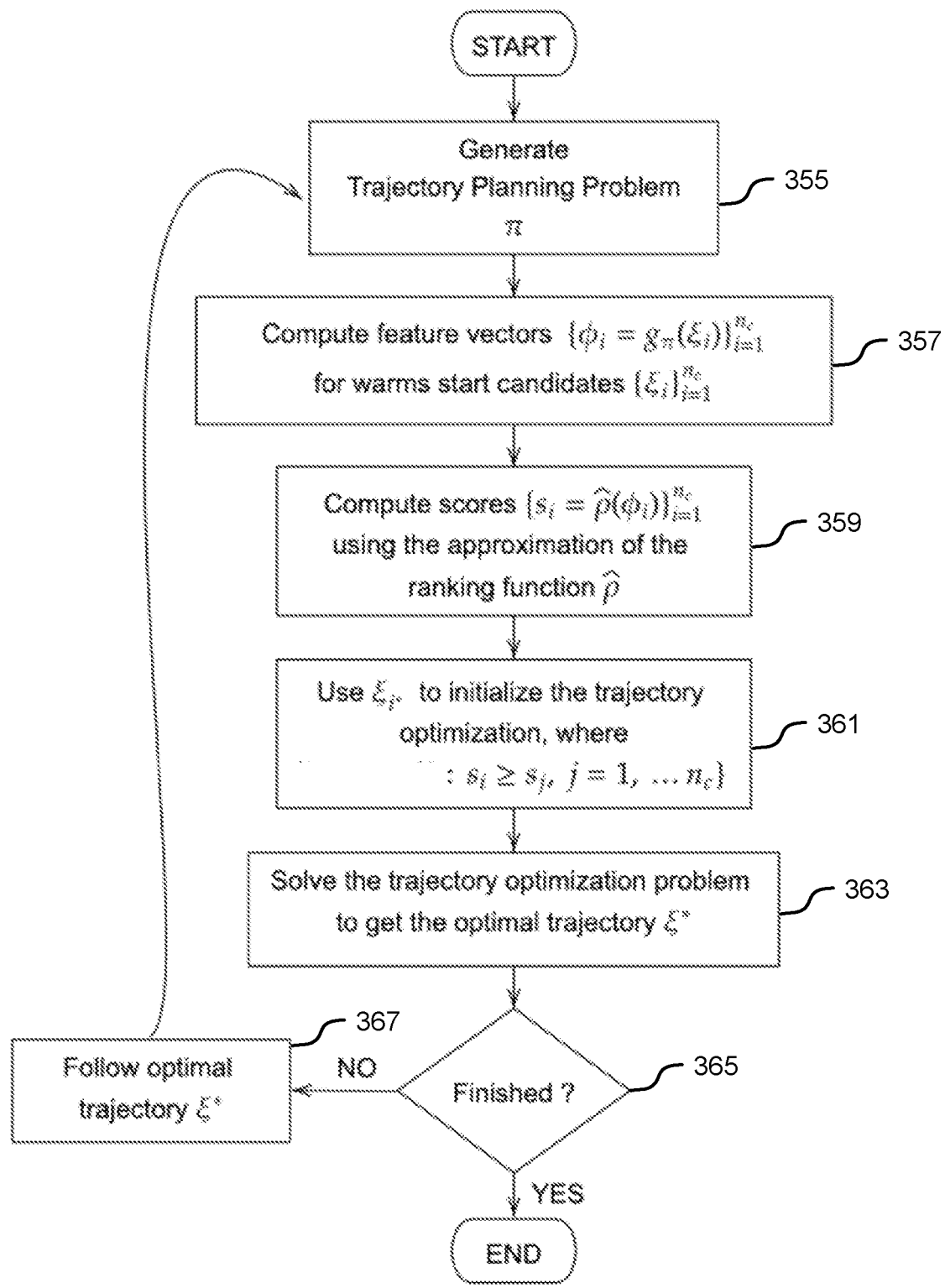
FIG. 6 illustrates an example implementation of a machine learning model based approximation in accordance with embodiments of the systems and methods described herein.

FIG. 6 illustrates an example implementation of a machine learning model based approximation in accordance with various embodiments. In particular, FIG. 6 illustrates an example approximation of the base ranking function $\hat{\rho}(\cdot)$ in the trajectory optimization loop as part of an autonomous driving system. Referring now to FIG. 6, at operation 355, a trajectory planning problem $\pi$ is generated and received by the system. The trajectory planning problem $\pi$ may include a needed trajectory to move the ego vehicle from one point to another location. As shown above, the system may receive warm start candidates for the trajectory.

At operation 357, the system the system computes features $\{\phi_i = g(\xi_i)\}_{i=1}^{n_c}$ for each of the warm start candidates $\{\xi_i\}_{i=1}^{n_c}$. In some embodiments, this may be implemented as described above with reference to operation 234 of FIG. 3. At operation 359, the system computes scores using an approximation of a ranking function $\hat{\rho}(\cdot)$. In one embodiment, the scores may be computed as $\{s_i = \hat{\rho}(\phi_i)\}_{i=1}^{n_c}$ based on this prediction.

At operation 361, the system uses the selected warm start trajectory to initialize the trajectory optimization. At operation 363, the system solves the trajectory optimization problem to get the optimal trajectory. Once the optimal trajectory is arrived at, it can be implemented in the vehicle to follow that optimal trajectory. This is illustrated at operation 365 and 367.

Figure 7:
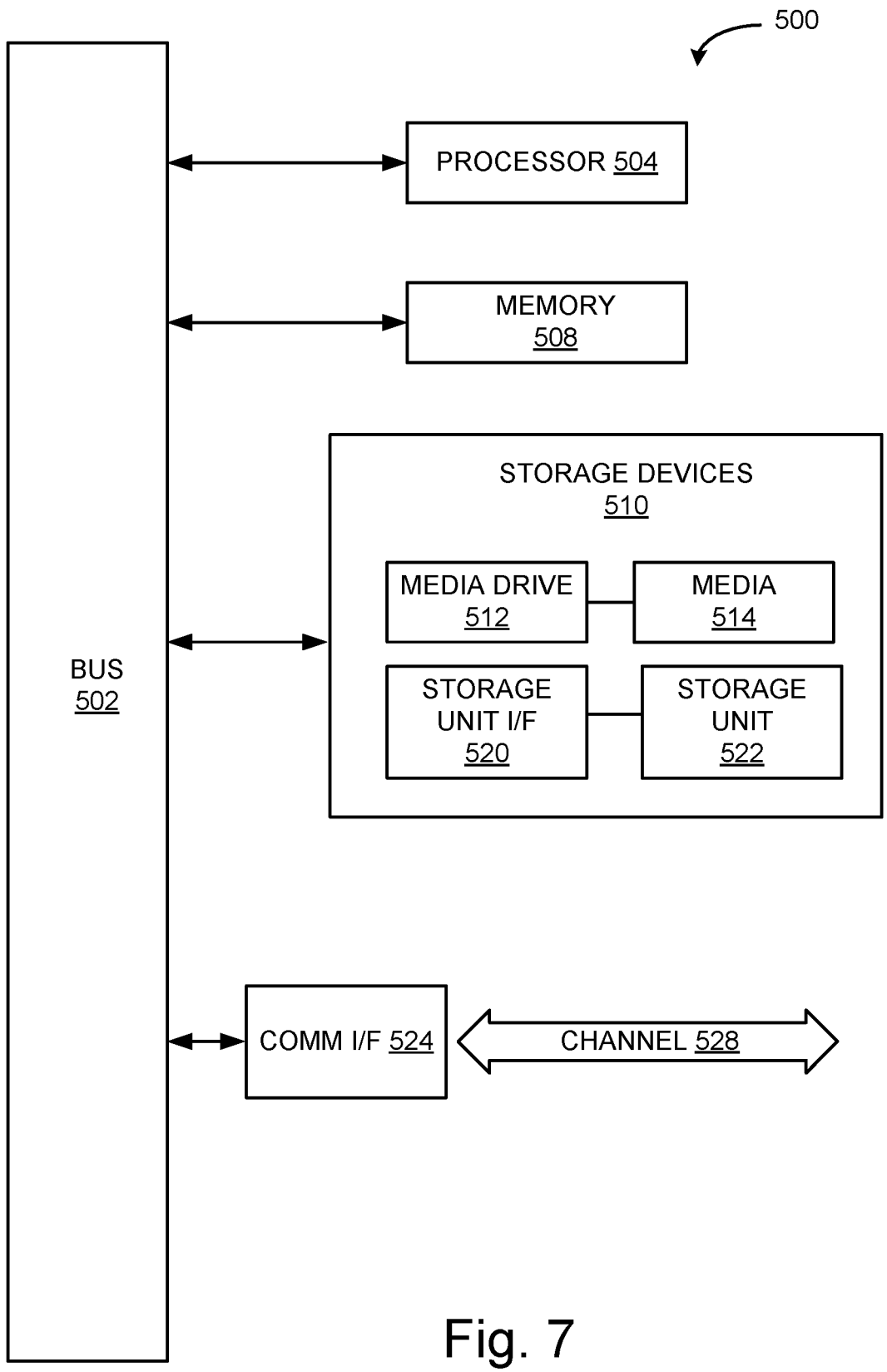
FIG. 7 is an example computing component that may be used to implement various features of embodiments of the systems and methods described herein.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 7. Various embodiments are described in terms of this example-computing component 500. After reading this description, it will become apparent to a person skilled in the relevant art how to implement the application using other computing components or architectures.

Referring now to FIG. 7, computing component 500 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 500 might also represent computing capabilities embedded within or otherwise available to a given device. For example, a computing component might be found in other electronic devices such as, for example, portable computing devices, and other electronic devices that might include some form of processing capability.

Computing component 500 might include, for example, one or more processors, controllers, control components, or other processing devices. Processor 504 might be implemented using a general-purpose or special-purpose processing engine such as, for example, a microprocessor, controller, or other control logic. Processor 504 may be connected to a bus 502. However, any communication medium can be used to facilitate interaction with other components of computing component 500 or to communicate externally.

Computing component 500 might also include one or more memory components, simply referred to herein as main memory 508. For example, random access memory (RAM) or other dynamic memory, might be used for storing information and instructions to be executed by processor 504. Main memory 508 might also be used for storing temporary variables or other intermediate information during execution of instructions to be executed by processor 504. Computing component 500 might likewise include a read only memory ("ROM") or other static storage device coupled to bus 502 for storing static information and instructions for processor 504.

The computing component 500 might also include one or more various forms of information storage mechanism 510, which might include, for example, a media drive 512 and a storage unit interface 520. The media drive 512 might include a drive or other mechanism to support fixed or removable storage media 514. For example, a hard disk drive, a solid-state drive, a magnetic tape drive, an optical drive, a compact disc (CD) or digital video disc (DVD) drive (R or RW), or other removable or fixed media drive might be provided. Storage media 514 might include, for example, a hard disk, an integrated circuit assembly, magnetic tape, cartridge, optical disk, a CD or DVD. Storage media 514 may be any other fixed or removable medium that is read by, written to or accessed by media drive 512. As these examples illustrate, the storage media 514 can include a computer usable storage medium having stored therein computer software or data.

In alternative embodiments, information storage mechanism 510 might include other similar instrumentalities for allowing computer programs or other instructions or data to be loaded into computing component 500. Such instrumentalities might include, for example, a fixed or removable storage unit 522 and an interface 520. Examples of such storage units 522 and interfaces 520 can include a program cartridge and cartridge interface, a removable memory (for example, a flash memory or other removable memory component) and memory slot. Other examples may include a PCMCIA slot and card, and other fixed or removable storage units 522 and interfaces 520 that allow software and data to be transferred from storage unit 522 to computing component 500.

Computing component 500 might also include a communications interface 524. Communications interface 524 might be used to allow software and data to be transferred between computing component 500 and external devices. Examples of communications interface 524 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 524 may be carried on signals, which can be electronic, electromagnetic (which includes optical) or other signals capable of being exchanged by a given communications interface 524. These signals might be provided to communications interface 524 via a channel 528. Channel 528 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 508, storage unit 520, media 514, and channel 528. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 500 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method of trajectory planning for an autonomous vehicle, comprising:
generating a plurality of candidate trajectories, the plurality of candidate trajectories including a sequence of waypoints for the autonomous vehicle associated with corresponding time instances;
computing features of a path associated with each of the plurality of candidate trajectories;
computing scores for the computed features of the plurality of candidate trajectories, wherein the computed scores are based on parameter values of the plurality of candidate trajectories;
evaluating the computed scores for each of the plurality of candidate trajectories, and selecting, based on the evaluation of the computed scores of the plurality of candidate trajectories, a trajectory from among the plurality of candidate trajectories to be used as a warm-start trajectory for trajectory optimization and applying the warm-start trajectory to develop a final trajectory for the autonomous vehicle; and
operating the autonomous vehicle in accordance with the final trajectory.

2. The method of claim 1, wherein computing features of the path associated with each of the plurality of candidate trajectories comprises feature mapping to map each trajectory $\xi$ into a multi-dimensional feature vector.

3. The method of claim 1, further comprising using a set of candidate trajectories of the plurality of candidate trajectories and scene features of the set of candidate trajectories as training data to train a machine learning module to predict scores for the set of candidate trajectories.

4. The method of claim 1, further comprising generating a decision tree to determine an index for each of a plurality of selected warm-start trajectory candidates offline and, during driving, using the decision tree to select the warm-start trajectory.

5. The method of claim 1, wherein the computing scores for the computed features of the plurality of candidate trajectories comprises predicting scores off-line based on data examples, and using this prediction on-line to select a subset of a smaller subset of the plurality of candidate trajectories, and selecting the warm-start trajectory from among the selected subset of the plurality of candidate trajectories.

6. The method of claim 1, further comprising using a machine learning module to predict a base ranking function used to compute the scores.

7. The method of claim 6, wherein inputs to the machine learning module comprise the plurality of candidate trajectories and the computed features for the plurality of candidate trajectories.

8. The method of claim 6, wherein the using the machine learning module comprises:
computing optimal trajectories based on the plurality of candidate trajectories;
computing scores for each of the optimal trajectories; and
generating a training data set.

9. The method of claim 8, wherein the developing the final trajectory for the autonomous vehicle comprises using the selected warm-start trajectory to initialize the trajectory optimization and using the trajectory optimization to determine an optimal trajectory.

10. The method of claim 8, wherein the training data set comprises training samples for planning problems generated and solved during an autonomous test drive.

11. The method of claim 1, further comprising selecting warm-start candidate trajectories to be included in the plurality of candidate trajectories, the selecting comprising ranking warm-start candidate trajectories during in-vehicle autonomous operation or driving tests, prioritizing the warm-start candidate trajectories according to their respective rankings, and choosing a subset of ranked warm-start candidate trajectories as the plurality of candidate trajectories based on their respective rankings.

12. A vehicle control system for trajectory planning for an autonomous vehicle, comprising:
a processor; and
a memory coupled to the processor to store instructions, which when executed by the processor, cause the processor to perform operations, the operations comprising:
computing features of a path associated with each of a plurality of candidate trajectories;
computing scores for the computed features of the plurality of candidate trajectories, wherein the computed scores are based on parameter values of the plurality of candidate trajectories;

evaluating the computed scores for each of the plurality of candidate trajectories, and selecting, based on the evaluation of the computed scores of the plurality of candidate trajectories, a trajectory from among the plurality of candidate trajectories to be used as a warm-start trajectory for trajectory optimization and applying the warm-start trajectory to develop a final trajectory for the autonomous vehicle; and operating the autonomous vehicle in accordance with the final trajectory.

13. The vehicle control system of claim 12, wherein the computing features of the path associated with each of the plurality of candidate trajectories comprises feature mapping to map each trajectory $\xi$ into a multi-dimensional feature vector.

14. The vehicle control system of claim 12, wherein the operations further comprise using candidate trajectories and their associated scene features as training data to train a machine learning module to predict scores for the candidate trajectories.

15. The vehicle control system of claim 12, wherein the operations further comprise generating a decision tree to determine an index for each of a plurality of selected warm-start trajectory candidates offline and, during driving, using the decision tree to select the warm-start trajectory.

16. The vehicle control system of claim 12, wherein the computing scores for the computed features of the plurality of candidate trajectories comprises predicting scores off-line based on data examples, and using this prediction on-line to select a subset of a smaller quantity of the plurality of candidate trajectories, and selecting the warm-start trajectory from among the selected subset of the plurality of candidate trajectories.

17. The vehicle control system of claim 12, wherein the operations further comprise using a machine learning module to predict a base ranking function used to compute the scores.

18. The vehicle control system of claim 17, wherein inputs to the machine learning module comprise the plurality of candidate trajectories and the computed features for the plurality of candidate trajectories.

19. The vehicle control system of claim 17, wherein the using the machine learning comprises:
computing optimal trajectories based on the plurality of candidate trajectories;
computing scores for each of the optimal trajectories; and
generating a training data set.

20. The vehicle control system of claim 19, wherein the developing the final trajectory for the autonomous vehicle comprises using the selected warm-start trajectory to initialize the trajectory optimization and using the trajectory optimization to determine an optimal trajectory.

21. The vehicle control system of claim 19, wherein the training data set comprises training samples for planning problems generated and solved during an autonomous test drive.

22. The vehicle control system of claim 12, wherein the operations further comprise selecting warm-start candidate trajectories to be included in the plurality of candidate trajectories, the selecting comprising ranking warm-start candidate trajectories during in-vehicle autonomous operation or driving tests, prioritizing the warm-start candidate trajectories according to their respective rankings, and choosing a subset of ranked warm-start candidate trajectories as the plurality of candidate trajectories based on their respective rankings.

23. The method of claim 1, further comprising:
generating a plurality of candidate maneuvers each defined by a corresponding candidate trajectory from the plurality of candidate trajectories to achieve the candidate maneuvers;
wherein the path is further associated with each of the plurality of candidate trajectories for the candidate maneuvers.

24. The vehicle control system of claim 12, wherein a plurality of candidate maneuvers are each defined by a corresponding candidate trajectory from the plurality of candidate trajectories to achieve the candidate maneuvers, and wherein the path is further associated with each of the plurality of candidate trajectories for the candidate maneuvers.

* * * * *